United States Patent [19]

Beck

[11] 4,423,794
[45] Jan. 3, 1984

[54] FLYWHEEL ASSISTED ELECTRO-MECHANICAL DRIVE SYSTEM

[75] Inventor: William H. Beck, Rancho Palos Verdes, Calif.

[73] Assignee: The Garrett Corporation, Los Angeles, Calif.

[21] Appl. No.: 243,134

[22] Filed: Mar. 12, 1981

[51] Int. Cl.³ .............................................. B60K 1/04
[52] U.S. Cl. .................................... 180/165; 74/675; 180/65 A
[58] Field of Search .................. 180/165, 65 R, 65 A, 180/65 C; 74/674, 675, 679, 686, 720.5; 318/139

[56] References Cited

U.S. PATENT DOCUMENTS

| | | |
|---|---|---|
| 60,126 | 12/1866 | Bicknell . |
| 468,526 | 2/1892 | Phillips . |
| 861,687 | 7/1907 | Wahle . |
| 931,743 | 8/1909 | Farrell . |
| 1,076,614 | 10/1913 | Thomas . |
| 1,199,004 | 9/1916 | Gray . |
| 2,295,289 | 9/1942 | Nardone . |
| 2,441,779 | 5/1948 | Troeger et al. . |
| 2,603,103 | 7/1952 | Sohon et al. . |
| 2,672,566 | 3/1954 | Heins . |
| 2,911,541 | 11/1959 | Neufville et al. . |
| 3,022,433 | 2/1962 | Ferranti . |
| 3,188,546 | 6/1965 | Dawkins . |
| 3,921,741 | 11/1975 | Garfinkle et al. ................ 180/65 A |
| 3,923,115 | 12/1975 | Helling . |
| 3,983,738 | 10/1976 | Vlasov et al. . |
| 4,066,934 | 1/1978 | Waldorf et al. .................... 318/139 |
| 4,233,858 | 11/1980 | Rowlett .............................. 74/675 |

*Primary Examiner*—Joseph F. Peters, Jr.
*Assistant Examiner*—Kenneth R. Rice
*Attorney, Agent, or Firm*—Henry M. Bissell; Albert J. Miller; James W. McFarland

[57] ABSTRACT

A vehicle propulsion system combines an electric motor-generator and battery with a flywheel as regenerative power sources. A planetary differential gear train couples together the shafts from the flywheel and the motor-generator. A controller connected between the battery and the motor-generator serves to maintain the current level to or from the battery with a range which develops optimum efficiency of battery energy utilization while causing the flywheel to absorb the relatively large peaks in battery power requirements.

In one embodiment, the controller is made up of a transistorized chopper, a free-wheeling diode, a regenerative diode, a current sensor, and a switch to change the controller between the motor and generator modes of operation. The motor-generator is a separately excited, DC machine.

20 Claims, 4 Drawing Figures

FLYWHEEL ASSISTED ELECTRO-MECHANICAL DRIVE SYSTEM

BACKGROUND OF THE INVENTION

1. Field of the Invention

This invention relates to prime movers such as may be used in vehicle propulsion systems, for example, and more particularly to electro-mechanical drive systems employing rotating flywheels for energy storage.

2. Description of the Prior Art

An energy-efficient alternative to the internal combustion engine presently used to propel automotive vehicles is urgently needed. The rapidly rising cost and diminishing availability of petroleum-derived fuels, coupled with the inherent pollution problems of the internal combustion engine, have spurred considerable effort in recent years toward realizing such an alternative.

Substantial research in recent years has gone into the development of improved flywheels for energy storage. New filamentary materials and ways of fabricating them have resulted in flywheels capable of extremely high rotational speeds, approaching 50,000 rpm, which have the capability of storing as much energy per pound of weight as the more advanced chemical batteries. Use of a flywheel in combination with electric motors is disclosed in the Thomas U.S. Pat. No. 1,076,614, entitled Winding Apparatus. Other systems utilizing a flywheel for energy storage are disclosed in the Heins U.S. Pat. No. 2,672,566 which combines a flywheel and an electric motor coupled together through a planetary gear system. Split path, power transmission systems in which part of the energy stored in a flywheel is converted to electrical power used to drive a traction motor are disclosed in the Rowlett U.S. Pat. No. 4,233,858.

Various combinations of flywheels and electric motors as power sources are disclosed in the Farrell U.S. Pat. No. 931,743, Nardone U.S. Pat. No. 2,295,289, Ferranti U.S. Pat. No. 3,022,433, Helling U.S. Pat. No. 3,923,115 and Vlasov et al U.S. Pat. No. 3,983,738. However, none of these examples of the prior art involves a battery-powered electric propulsion system of the regenerative type coupled with a regenerative flywheel for energy storage and a controller in the manner of the present invention.

SUMMARY OF THE INVENTION

In brief, arrangements in accordance with the present invention comprise an electro-mechanical drive system with flywheel assist to provide conversion between kinetic and chemical energy storage and mechanical driving power. The preferred application of such a drive system is for vehicle propulsion. The inclusion of the flywheel in such a system serves to absorb the high peak power requirements of the system, thereby levelling the load on the battery. The most significant peaks in power occur when the vehicle is accelerated and, in some configurations, when the vehicle is decelerated using regenerative braking techniques. Such peak power excursions can significantly reduce the capability of a battery to deliver energy. The energy stored in a battery is delivered at an optimum efficiency when the battery energy is withdrawn or inserted without extreme power peaks. It has been recognized that, by augmenting the drive system with a mechanical flywheel, the peak power withdrawn from the battery can be supplied by the flywheel, thereby "load levelling" the battery. In the present drive system which also uses regeneration for vehicle braking, the flywheel can receive the regenerated energy without attempting to return this high peak power to the battery. In the present system, not only are these power peaks diverted from the battery, thus prolonging battery life, but the regenerative peak power is stored in flywheel kinetic energy in a form which can be retrieved for vehicle propulsion.

The planetary differential gear train and associated controller systems in accordance with the invention serve to apportion the loads between the battery and the flywheel in an optimum manner. This is so, regardless of whether the energy is being taken from the energy sources for propulsion or delivered to the energy sources during regenerative braking.

One particular controller which may be used in arrangements embodying the present invention comprises a transistorized chopper, a free-wheeling diode, a regenerative diode, a current sensor, and a switch to change the controller between motor and generator operating modes. The motor-generator is a separately excited, DC machine.

BRIEF DESCRIPTION OF THE DRAWING

A better understanding of the present invention may be had from a consideration of the following detailed description, taken in conjunction with the accompanying drawing in which.

DESCRIPTION OF THE PREFERRED EMBODIMENT

Figure 1:
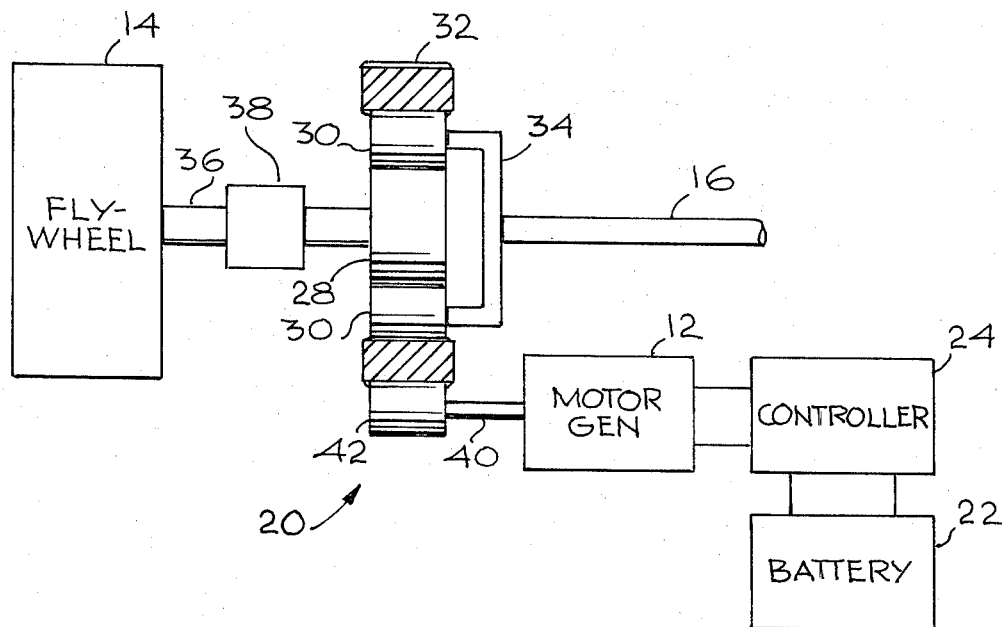
FIG. 1 is a schematic block diagram of one particular arrangement in accordance with the present invention.
Figure 2:
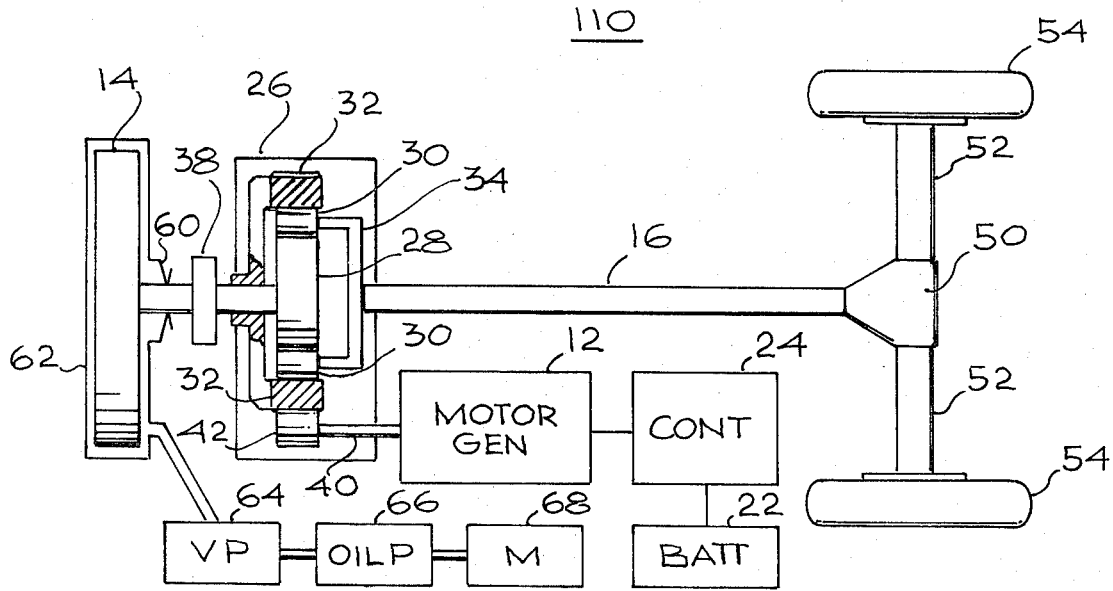
FIG. 2 is a schematic block diagram illustrating a vehicle propulsion system incorporating the arrangement of FIG. 1.

As shown in FIGS. 1 and 2, the basic system 10 of the present invention comprises a motor-generator 12 and a flywheel 14 mechanically intercoupled to a drive shaft 16 through a planetary differential gear train 20. The motor-generator 12 is electrically connected to a battery 22 through a controller 24. The planetary gear train 20 is shown comprising a housing 26, a sun gear 28, a plurality of planet gears 30 (typically three to five in number) and an outer ring gear 32. The ring gear 32 has inner and outer rows of gear teeth. The inner row engages the planet gears 30 which are mounted on a carrier 34 which is connected to the drive shaft 16. The flywheel 14 has a shaft 36 which is coupled to the sun gear 28 via an anti-reverse mechanism 38. The motor-generator 12 has a shaft 40 on which is mounted a spur gear 42 which engages the outer row of teeth on the ring gear 32.

As shown in FIG. 2, the overall propulsion system includes a conventional hypoid differential 50 coupled via axles 52 to vehicle drive wheels 54.

The structural details of the flywheel 14 are not a part of the present invention and need not be gone into in depth. Flywheel propulsion systems are currently employed in rail car and bus propulsion systems and are therefore well known in the art. Typically, as indicated in FIG. 2, these flywheels operate in a vacuum environment maintained by a vacuum seal 60 of a housing 62 and a vacuum system which includes a vacuum pump 64, an oil pump 66 and a motor 68.

Planetary gear trains, sometimes referred to as epicycloid gear systems, are well known not only for their use as simple torque dividers in automotive drive axles, but also for their potential for adaptive speed control. These systems have the ability to alter speed internally to maintain optimum power flow under all operating conditions. They are capable of making these changes automatically without additional governors or sensing devices. A good description of such systems with their various power flow paths and shaft speed relationships may be found in an article entitled "Power Flow in a Differential" by Fred A. Shen, MACHINE DESIGN, Apr. 8, 1976, pages 77–79, copy attached as Appendix A and incorporated herein by reference. In simplistic terms, the speed of the output drive shaft 16 is the sum of the speeds of the sun gear 28 and the ring gear 32. For example, the sun gear (and flywheel) could be turning clockwise at speed +S. With the appropriate gear ratios, the motor-generator (in terms of the ring gear) could be turning counterclockwise at speed −S. The output drive shaft would therefore be at zero speed. If the motor-generator is reduced from speed −S to zero (and assuming the sun gear and flywheel remain at speed +S), the carrier and output drive shaft would increase to speed +S. If the motor-generator were then reversed in direction and increased to speed +S (still assuming the sun gear and flywheel speed remain at speed +S), the carrier and output drive shaft would double in speed to 2 S.

When practical flywheels and vehicle inertia are connected into such a system, the flywheel speed does not remain constant. The torque required to accelerate the drive shaft is provided by the motor-generator. However, a large portion of the energy required to accelerate the drive shaft can be delivered by the flywheel. To accomplish this, the motor-generator must apply a force to slow down the ring gear. Using the initial speeds of the example above, the motor-generator would operate in a generator mode, supplying power through the controller to the battery. This action will slow down the ring gear, accelerate the output drive shaft, and withdraw energy from the flywheel. When the ring gear has reached zero speed, the motor-generator operates in a motoring mode, withdrawing energy from the battery and applying torque (in the same direction) to the ring gear. The ring gear will now increase in speed, and energy will be supplied by both the battery and flywheel to further increase the speed of the drive shaft. During these actions, the flywheel speed will decrease (due to the extraction of energy) and, if continued, the flywheel will eventually reach zero speed and attempt to reverse. Flywheel reversal is inhibited by any of several anti-reversal mechanisms which are well known in the art. For drive shaft speeds higher than that occurring at zero flywheel speed, the motor-generator speed will increase in direct proportion. The graph of FIG. 3 illustrates the speeds associated with the various components.

Figure 3:
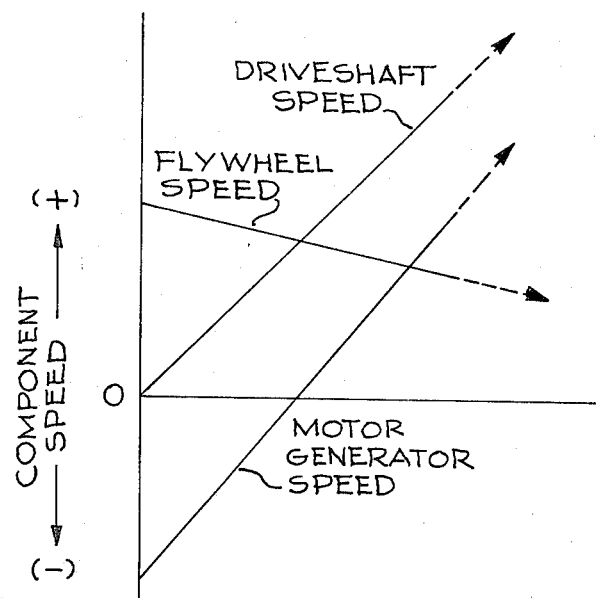
FIG. 3 is a graph illustrating the relationship of the rotational speeds of the respective components of the arrangement of FIG. 1.

Assuming that the drive shaft speed change is accomplished with a constant torque, the speed curves shown in FIG. 3 also represent the power involved with the various components. Similarly the area under each curve represents the energy associated with the corresponding component. Note that for this example, the power peaks associated with the motor generator are only slightly higher than half the peak power delivered to the drive shaft. The remaining portion of the power is delivered directly from the flywheel through the gear linkage. It may also be noted that if the output shaft energy is considered to be 100%, the motor-generator has only processed about 60%. The remaining 40% is provided from the flywheel through the gear linkage.

The system is inherently reversible. To return the output drive shaft to zero speed, the motor-generator torque is reversed such that the ring gear speed is returned through zero to its initial negative speed. This action also returns energy to the flywheel such that the cycle can be repeated. For reverse drive, the negative speed of the motor-generator is increased, thus extending the curves of FIG. 3 to the left of the zero point for drive shaft speed in FIG. 3.

Figure 4:
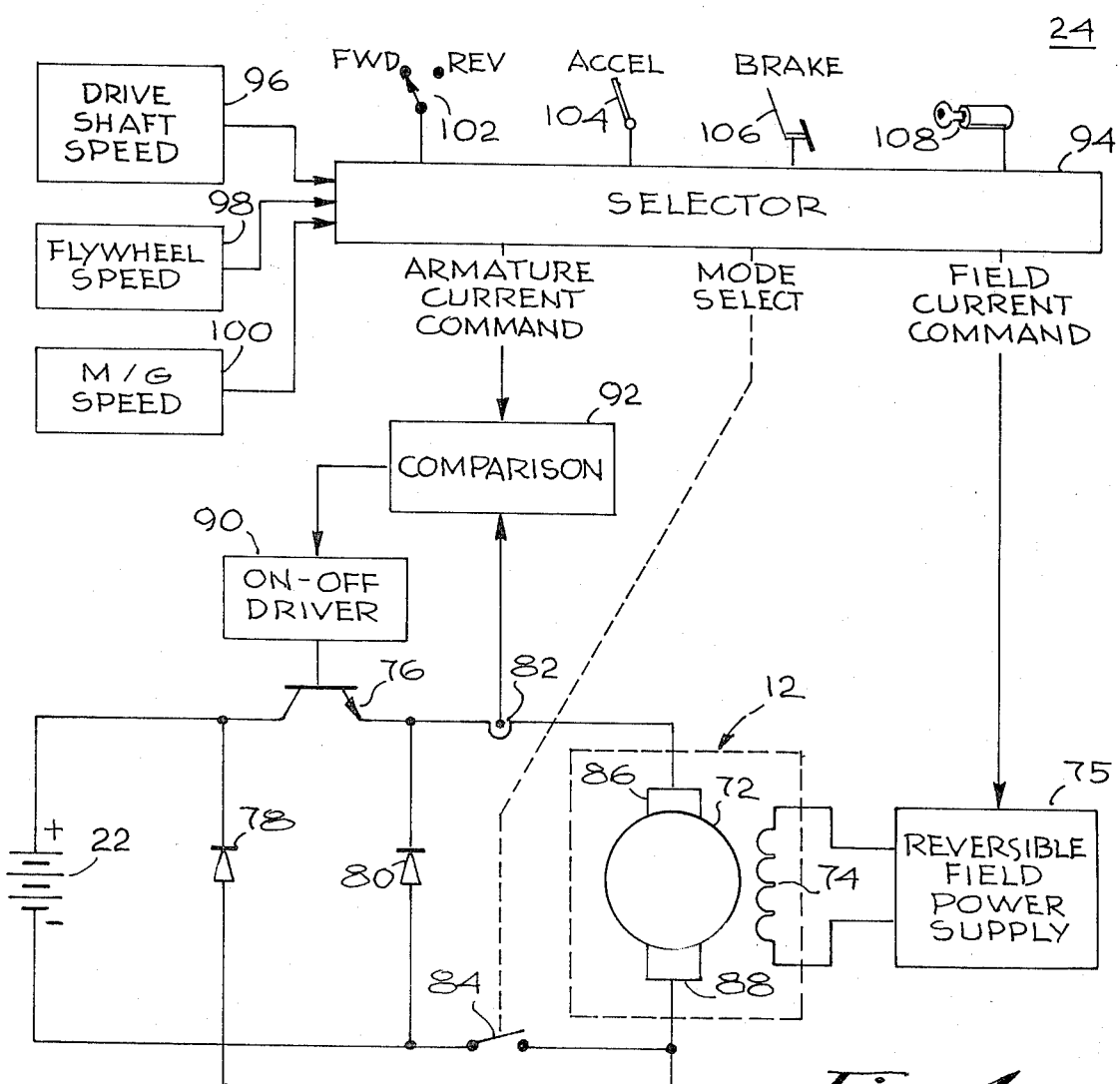
FIG. 4 is a schematic diagram representing the controller circuitry for the arrangement of FIG. 1.

A circuit for a particular controller 24 for the vehicle propulsion system 10 of FIG. 1 is shown schematically in FIG. 4. The motor-generator 12 is shown as a separately excited DC machine having independent control of the currents for the armature 72 and the field 74, the latter being connected to a reversible field power supply 75. Connected in circuit between the battery 22 and the armature 72 are a chopper transistor 76, a regenerative diode 78, a free-wheeling diode 80, a current sensor 82 and a mode switch 84. The chopper transistor 76 and the current sensor 82 are connected in series between the positive terminal of the battery 22 and the upper pole 86 of the armature 72. The mode switch 84, the condition of which (open or closed) is controlled to select the motor or generator mode of the DC machine, is in series between the negative terminal of the battery 22 and the lower pole 88 of the armature 72. The regenerative diode 78 is connected between the common junction of the armature pole 88 and the switch 84 and the positive terminal of the battery 22, polarized in a direction to permit current flow from the pole 88 to the battery 22. The free-wheeling diode 80 is connected from the negative terminal of the battery 22 to a point between the transistor 76 and the current sensor 82. The transistor 76 is controlled by an on-off driver stage 90 which is coupled to a comparison stage 92, the latter being adapted to receive input signals from the current sensor 82 and an armature current command from an associated selector 94 and to perform a comparison thereof. The selector 94 receives inputs of drive shaft speed 96, flywheel speed 98 and motor-generator speed 100, together with control commands from a forward-/reverse control 102, an accelerator control 104, brake 106 and on-off switch 108, and generates corresponding commands for armature and field current control and mode selection, as described.

In the motoring mode, the field current from the reversible field power supply 75 is of a polarity such that a negative polarity is produced at the terminal 88 and the mode switch 84 is closed. The transistor 76 is momentarily turned on to permit current to flow from the battery 22 through the armature 72, returning to the battery through the mode switch 84. When the current has reached a first preselected value, detected by the current sensor 82, corresponding to the armature current command, the transistor is turned off. Current flow from the battery 22 is interrupted, while current through the motor and its associated inductances continues through the free-wheeling diode 80. When this current decreases to a second preselected value, the transistor 76 is turned on once again and the cycle is repeated. In this manner, the level of armature current is controlled during the motor mode of operation.

In the generating mode, the reversible field supply 75 reverses polarity so that a positive polarity is produced on the armature terminal 88 and the mode switch 84 is opened. The transistor 76 is turned on momentarily and current builds up in the armature, flowing through the regenerative diode 78 and essentially shorting the armature through the diode 78 and the transistor 76, plus the internal armature impedance. There is no current flowing in the battery 22 at this time. When the armature current reaches another preselected value, the transistor 76 is turned off, thus forcing current from the armature 72 to flow from the terminal 88 through the regenerative diode 78 and into the battery 22, returning to the terminal 86 of armature 72 through the free-wheeling diode 80 and the current sensor 82. When current in this path has decreased to still another preselected value, the transistor 76 is turned on once again and the cycle is repeated. In this manner, the level of current in the armature 72 can be controlled during the generator mode of operation.

A typical acceleration and run sequence is as follows. The initial conditions for such a sequence are: (a) the flywheel and sun gear are running at maximum speed; (b) the planet gear and drive shaft are at zero speed; and (c) the ring gear and motor-generator are at maximum negative speed. These initial conditions are developed by operating with the mode switch in the motoring position (closed) and driving the motor-generator 12 as a motor to develop the flywheel and motor-generator speeds as specified.

Following the establishment of the specified initial conditions, the mode switch 84 is opened to establish the generator mode and the current in the field 74 is established to create a positive polarity at the armature terminal 88. The field current command and armature current command from the selector 94 are adjusted to generate positive ring gear torque. The ring gear will slow down, the planet gear and drive shaft will speed up, and the sun gear and flywheel will begin to slow down at a rate depending upon the initial stored energy and the applied torque. When the motor-generator 12 decreases in speed to nearly zero, the mode switch 84 is closed to create the motoring mode. The system continues to operate with the field current and armature current command control to continue producing positive ring gear torque. The ring gear and motor generator will speed up in the opposite direction, while the planet gears and drive shaft continue to accelerate and the flywheel and sun gear continue to slow down. This condition may continue, with controllable torque, until the flywheel and sun gear reach zero speed. Reverse rotation of the flywheel may be prohibited by using an anti-reverse mechanism, as indicated above. When the flywheel is at zero speed, all of the drive shaft power is delivered from the battery through the controller and the motor generator.

A typical deceleration and stop sequence is as follows. Initial conditions are: (a) the flywheel and sun gear are at reduced or zero speed; (b) the planet gear and drive shaft are at some speed above zero; and (c) the ring gear and motor-generator are at the differential speed. The armature and field currents in the motor generator 12 are at zero. The mode switch 84 is then opened and the current in the field 74 is established to make the armature pole 88 positive. The motor generator 12 is then operated with field current control and/or armature current control to develop negative torque on the ring gear. The ring gear will slow down, the planet gear coupler and drive shaft will slow down and the flywheel and sun gear will begin to speed up, while current is fed into the battry 22 as described above for the generator mode. When the motor generator has decreased in speed to nearly zero, the mode switch 84 is closed in order to create the motoring mode. Thereafter, the armature and field current commands are applied to cause the motor-generator 12 to continue producing negative torque on the ring gear. The ring gear and motor-generator will speed up in the opposite direction, the planet gears and drive shaft will continue to slow down, and the fly wheel and sun gear will continue to accelerate. This condition may continue until the drive shaft is stopped (typically held at that point by a friction brake). The flywheel, if not at full speed, will continue to be accelerated with power supplied from the battery through the controller and the motor-generator.

For driving the drive shaft in a reverse direction, for backing up the vehicle, the operation is as follows: mode switch 84 is closed, and the controller 24 operates to increase the negative speed of the motor-generator 12. As the speed of the motor-generator and ring gear increases, the planet gears and drive shaft will rotate in the reverse direction. Power for this reverse operation is supplied from the battery 22. Reverse operation can be produced at any flywheel speed.

Systems in accordance with the invention provide considerable flexibility for different uses. The most obvious modifications involve the gear ratios in the planetary differential gear train. By changing the gear ratios, the various speeds and torques can be tailored for a particular application. Similarly the slopes and crossover points of the speed curves can be varied by modifying the gear ratios and the energy stored in the flywheel. The system torque can be controlled by varying the motor-generator torque by means of the controller. In this manner, the drive shaft torque and speed can be brought up under automatic or manual control.

The systems of the present invention provide a number of advantages over alternative systems. This system requires only one motor-generator and controller, as contrasted with the plurality of motor-generators and dual controllers or more complex controllers of known prior art systems. The flywheel of this system can be relatively small and still provide significant system benefits. A variable ratio mechanical transmission is not required in order to achieve full range operation. The present system can provide full range drive shaft torque and speed with a discharged or locked flywheel. Although the disclosed embodiment incorporates a separately excited DC machine, the system can accommodate a wide variety of motor-generator and controller techniques, as for example DC motors, induction motors, synchronous motors, etc. The system provides a significant measure of load levelling for the battery power source in both the acceleration and deceleration modes of operation. A significant portion of the power and energy is processed through the planetary gear train, thereby reducing the losses associated with directly coupled electric motor generators and controllers. The system is relatively simple in design and low in cost, thereby enabling cost-effective implementation and installation. For extended driving cycles, the flywheel speed is reduced to zero; thus the losses associated with a spinning wheel do not penalize the system efficiency.

Although there have been described above specific arrangements of a flywheel assisted electro-mechanical drive system in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. An electro-mechanical drive system for vehicles comprising:
 a planetary differential gear transmission having three separate shafts coupled respectively to a sun gear, planet gears and a ring gear;
 a propulsion drive shaft coupled to a first one of said shafts;
 a flywheel coupled to a second one of said shafts;
 a motor-generator coupled to a third one of said shafts and having the capability of operating as a motor to drive the third shaft and as a generator to develop an output current when driven by the third shaft, the motor-generator and the flywheel being the only sources of propulsion in said drive system;
 electrical storage means for supplying electrical energy to the motor-generator when operated as a motor and for receiving electrical energy from the motor-generator when operated as a generator; and
 electrical control means for selectively controlling the motor-generator to cause the flywheel to deliver driving power to the drive shaft.

2. The system of claim 1 wherein the control means further includes means for causing the planetary transmission to deliver power from the drive shaft to the flywheel during a regenerative braking mode.

3. The system of claim 1 or claim 2 wherein the control means includes means for limiting current flowing between the battery and the motor-generator to a level within a preselected range.

4. The system of claim 1 wherein the control means includes means for operating the motor-generator to cause the drive shaft to be driven in the reverse direction in response to operator command.

5. The system of claim 1 wherein the control means includes mode switching means for operating the motor-generator selectively in either a motoring or a generator mode.

6. The system of claim 1 wherein the first shaft is coupled to the planet gears, the second shaft is coupled to the sun gear, and the third shaft is coupled to the ring gear.

7. An electro-mechanical drive system for vehicles comprising:
 a planetary differential gear transmission having three separate shafts coupled respectively to a sun gear, planet gears and a ring gear;
 a propulsion drive shaft coupled to a first one of said shafts;
 a flywheel coupled to a second one of said shafts;
 a motor-generator coupled to a third one of said shafts and having the capability of operating as a motor to drive the third shaft and as a generator to develop an output current when driven by the third shaft;
 electrical storage means for supplying electrical energy to the motor-generator when operated as a motor and for receiving electrical energy from the motor-generator when operated as a generator; and
 electrical control means for selectively controlling the motor-generator to cause the flywheel to deliver driving power to the drive shaft;
 wherein the motor-generator is a separately excited DC machine having means for separately controlling the polarity and direction of current to a field winding thereof, and further comprising a mode switch connected between one side of the motor-generator armature and the battery with a current interrupting means connected between the other side of the motor-generator armature and the other side of the battery.

8. The system of claim 7 wherein the control means further comprises a driving stage coupled to the current interrupting means for selectively controlling the current interrupting means between on and off positions.

9. The system of claim 8 further including current sensing means connected in series with the armature, and a comparison stage coupled to receive input signals from the current sensing means and from a current control means for making a comparison between said two input signals and applying an output signal to control the driving stage.

10. The system of claim 9 wherein the control means further includes a first diode coupled between one pole of the armature and a corresponding terminal of the battery for conducting charging current to the battery when the current interrupting means is in the off condition and the motor-generator is being operated in a generating mode.

11. The system of claim 10 wherein the control means further comprises a free-wheeling diode connected in a circuit path across the armature to conduct armature current when the current interrupting means is in the off condition and the motor-generator is being operated as a motor.

12. The system of claim 7 further including reversible power supply means coupled to control the magnitude and direction of current in the motor-generator field winding in response to applied field current command signals.

13. The system of claim 12 further including means for controlling the mode switch between motoring and generating mode positions in response to applied command signals.

14. The system of claim 7 wherein the control means further includes selector means operable for selectively controlling armature current and field current in accordance with the conditions of associated accelerator, brake and forward/reverse switch devices.

15. The system of claim 14 wherein the selector means further includes means for monitoring speeds of the drive shaft, the flywheel and the motor-generator.

16. The method of controlling a battery powered motor-generator intercoupled with a flywheel and a vehicle drive shaft through a planetary differential gear transmission comprising the steps of:
 selecting between motor and generator modes of operation for the motor-generator;
 establishing a motor-generator field in accordance with a predetermined field current command signal; and
 controlling the armature current of the motor-generator within preselected levels to develop a torque at the planetary transmission which controls the proportion of power flow contributed by the flywheel to level out peak curent loads applied to the battery, the step of controlling the armature current including sensing the level of armature current, comparing the sensed level with a preselected command signal, and variably controlling the armature current in accordance with the difference between the sensed level and the command signal.

17. The method of claim 16 wherein the mode selecting step includes selecting the motor mode of operation, and further including periodically interrupting the current from the battery while permitting armature current to flow through a unidirectional bypass path and continuing to sense the level of armature current.

18. The method of claim 16 wherein the mode selecting step includes selecting the generator mode of operation, and further including permitting generated armature current to build up to a first preselected level, then interrupting one armature current path to divert induced current to the battery until the current drops to a second preselected level, and repeating the cycle in order to build up charge in the battery.

19. The method of controlling a battery powered motor-generator intercoupled with a flywheel and a vehicle drive shaft through a planetary differential gear transmission comprising the steps of:

selecting between motor and generator modes of operation for the motor-generator;

establishing a motor-generator field in accordance with a predetermined field current command signal; and controlling the armature current of the motor-generator within preselected levels to develop a torque at the planetary transmission which controls the proportion of power flow contributed by the flywheel to level out peak current loads applied to the battery;

wherein the step of establishing the motor-generator field includes establishing a polarity of field effective to induce an armature potential polarity opposing the polarity of the battery while selecting the generator mode of operation.

20. The method of controlling a battery powered motor-generator intercoupled with a flywheel and a vehicle drive shaft through a planetary differential gear transmission comprising the steps of:

selecting between motor and generator modes of operation for the motor-generator;

establishing a motor-generator field in accordance with a predetermined field current command signal; and controlling the armature current of the motor-generator within preselected levels to develop a torque at the planetary transmission which controls the proportion of power flow contributed by the flywheel to level out peak current loads applied to the battery;

wherein the step of establishing the motor-generator field includes establishing a polarity of field effective to establish an armature potential polarity such as to draw current from the battery while operating as a motor and concurrently selecting the motor mode of operation.

* * * * *